United States Patent [19]
Yokoya et al.

[11] Patent Number: 5,134,566
[45] Date of Patent: Jul. 28, 1992

[54] SHOCK ABSORBER CONTROL SYSTEM

[75] Inventors: Yuji Yokoya, Toyota; Yasuhiro Tsutsumi, Susono; Yutaka Suzuki, Nishio; Yoshimichi Hara, Kuwana; Akira Fukami, Okazaki, all of Japan

[73] Assignee: Toyota Jidosha Kabushiki Kaisha, Toyota, Japan

[21] Appl. No.: 656,726

[22] Filed: Feb. 19, 1991

[30] Foreign Application Priority Data

Feb. 16, 1990 [JP] Japan .................................. 2-36847

[51] Int. Cl.$^5$ ........................................... B60G 17/00
[52] U.S. Cl. .............................. 364/424.05; 280/707; 280/840; 364/550
[58] Field of Search ...................... 364/424.05, 426.02, 364/550, 551.01; 280/707, 840, DIG. 1; 73/105, 146

[56] References Cited

U.S. PATENT DOCUMENTS

| | | | |
|---|---|---|---|
| 4,809,197 | 2/1989 | Tashiro et al. | 364/550 |
| 4,837,727 | 6/1989 | Tashiro et al. | 364/551.01 |
| 4,936,604 | 6/1990 | Kawagoe et al. | 364/424.05 |
| 4,967,359 | 10/1990 | Sugasawa et al. | 280/707 |
| 4,984,163 | 1/1991 | Kuwana et al. | 364/551.01 |
| 5,034,890 | 7/1991 | Sugasawa et al. | 364/424.05 |
| 5,085,288 | 2/1992 | Shiraishi et al. | 364/426.02 |

Primary Examiner—Gary Chin
Attorney, Agent, or Firm—Cushman, Darby & Cushman

[57] ABSTRACT

A shock absorber control system having shock absorbers provided respectively between wheels of a vehicle and a body thereof includes road surface condition detecting units provided for the respective shock absorbers, and damping force characteristic alteration units provided for the respective shock absorbers. The shock absorber control system also includes a correction unit for separately generating signals indicative of detection characteristics of the road surface condition detecting units provided for the respective shock absorbers on the basis of road surface condition detection signals generated by the road surface condition detecting units and for separately correcting either reference values used for determining whether or not the road surface is rough by the damping force characteristic alteration units or the road surface condition detection signals on the basis of the detection characteristics of the road surface condition detecting units provided for the respective shock absorbers.

10 Claims, 13 Drawing Sheets

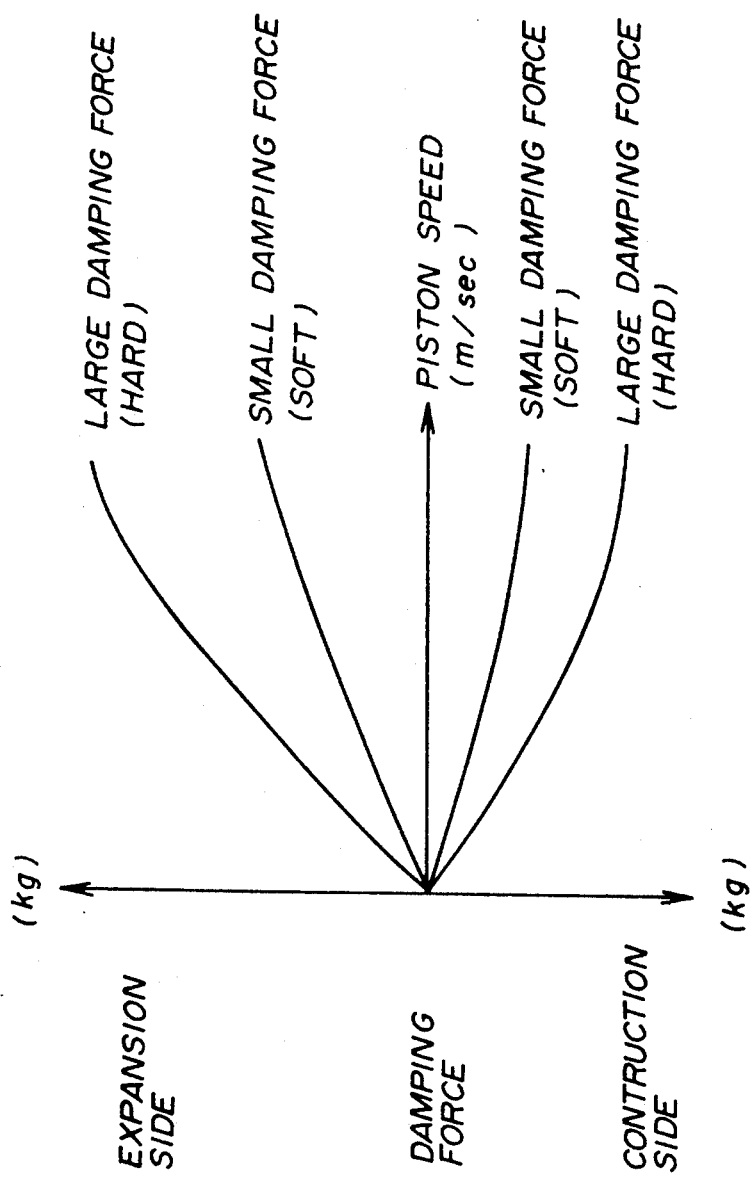

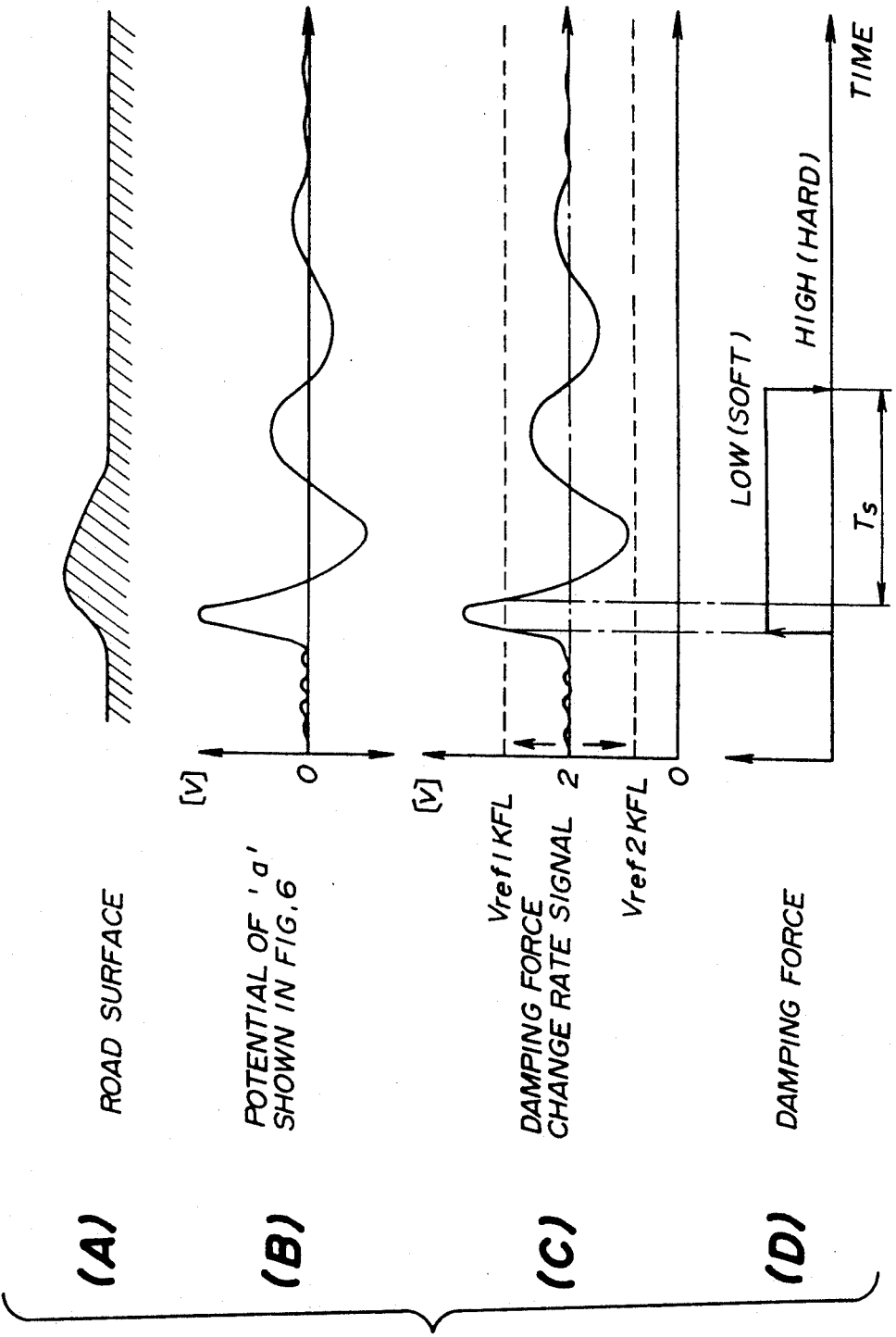

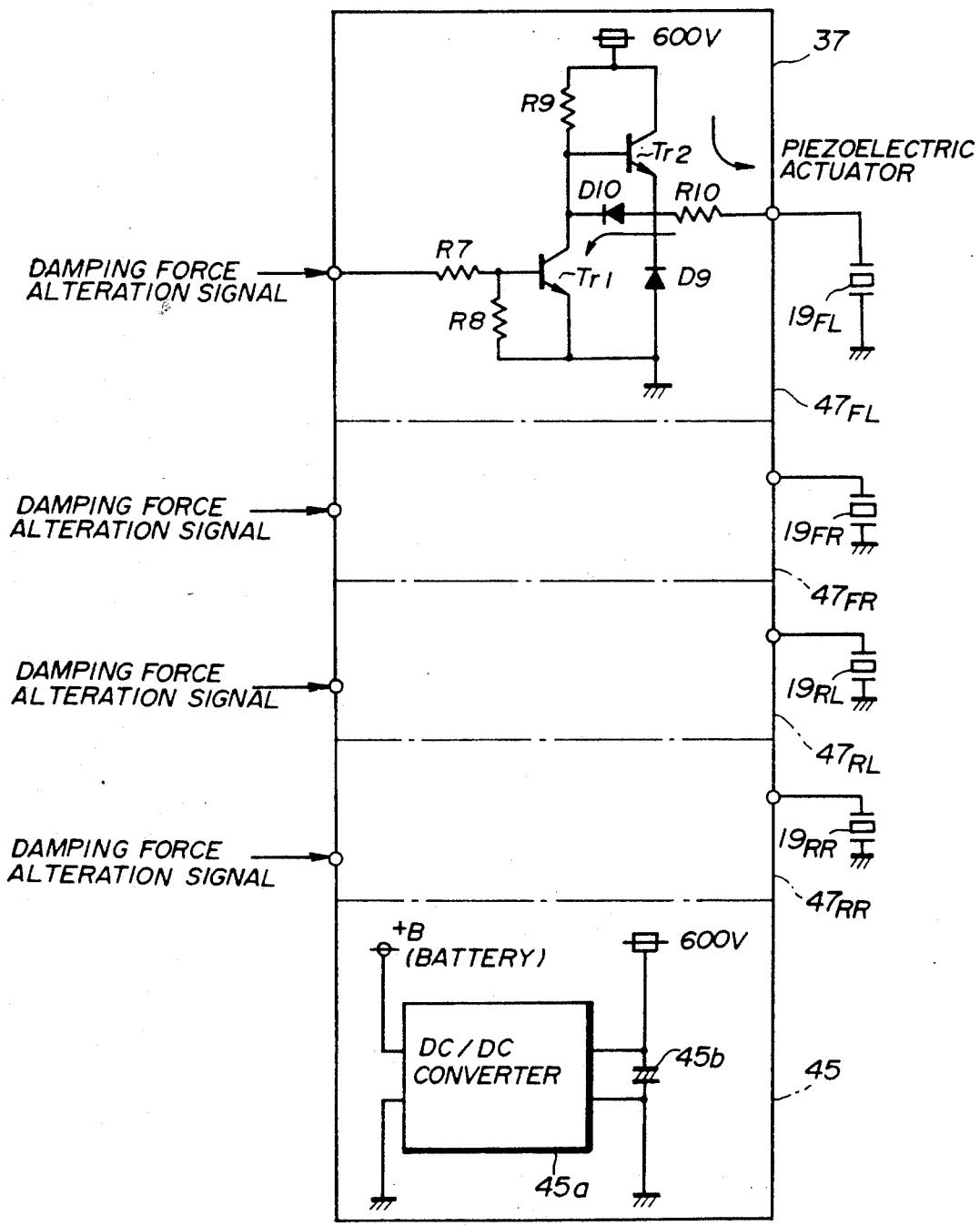

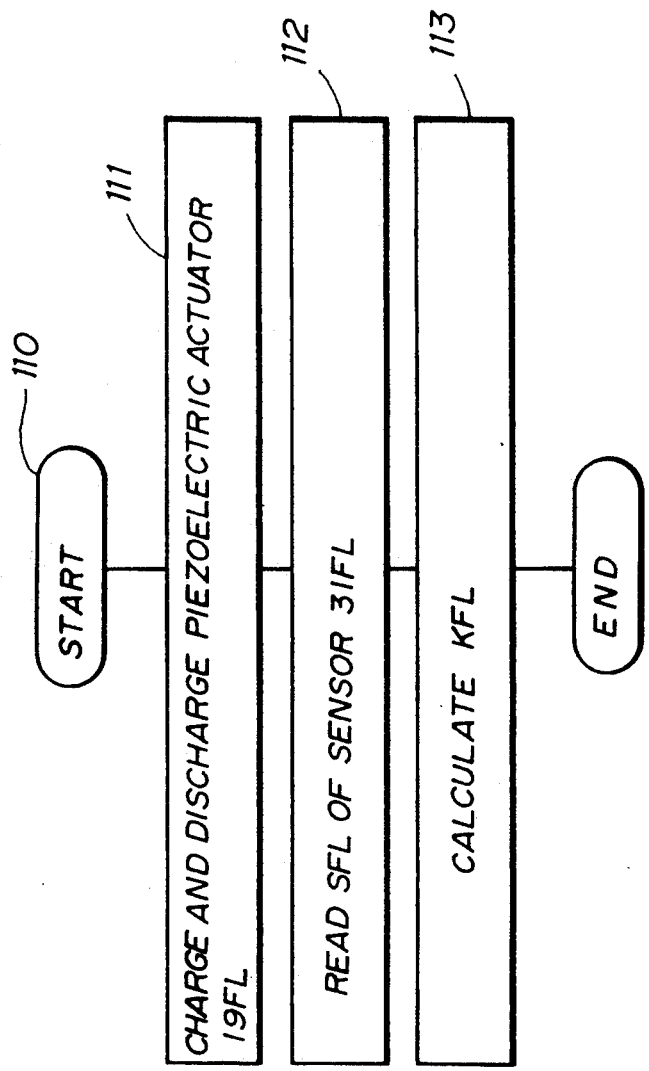

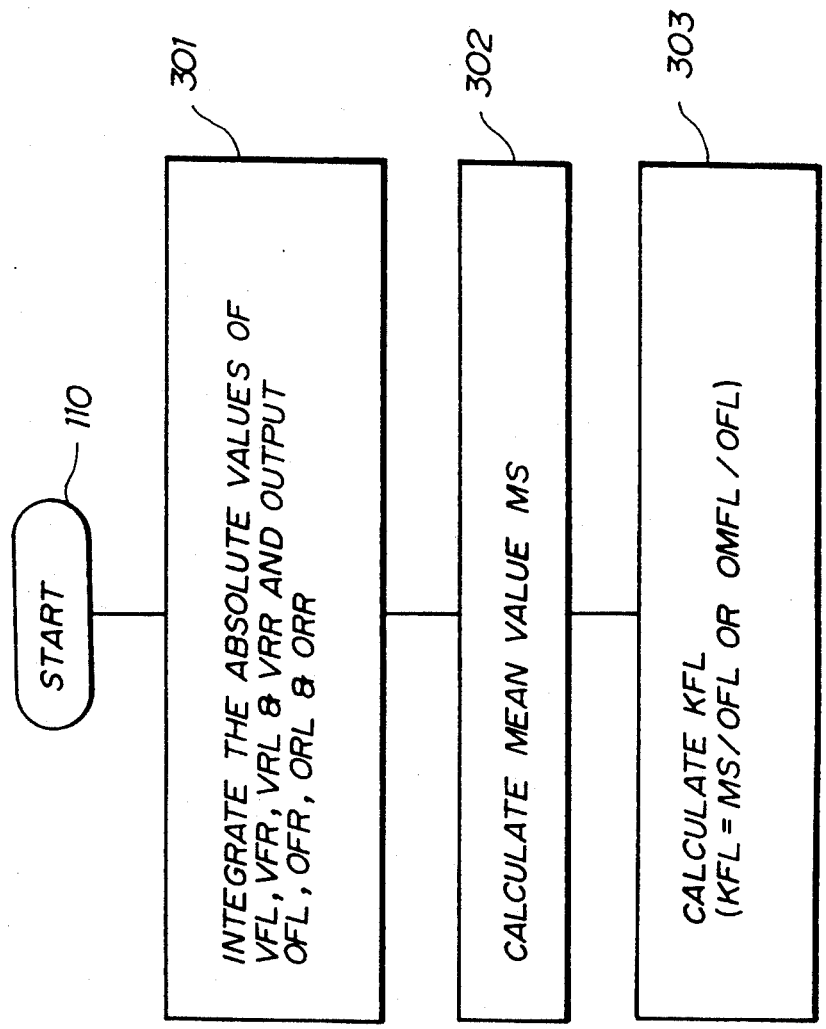

SHOCK ABSORBER CONTROL SYSTEM

BACKGROUND OF THE INVENTION

1) Field of the Invention

The present invention generally relates to a shock absorber control system which alters the setting (characteristic) of the damping force of each shock absorber provided in a vehicle on the basis of the condition of a road surface on which the vehicle is traveling.

2) Description of the Prior Art

There is previously known a shock absorber control system which switches the setting of the damping force of a shock absorber between a high level (hard state) and a low level (soft state) on the basis of the condition (roughness) of a road surface on which the vehicle is traveling.

Japanese Laid-Open Patent Application No. 64-67407 discloses an arrangement in which it is determined whether or not the road surface on which the vehicle is traveling is rough on the basis of a damping force change rate obtained from an output signal of a piezoelectric load sensor provided in a shock absorber. More specifically, the damping force change rate is compared with a threshold value based on the vehicle driving condition. When the damping force change rate exceeds the threshold value, the setting of the damping force of the shock absorber is altered to the low level (soft state) from the high level (hard state).

In actuality, a sensor for detecting the damping force change rate is provided for a shock absorber provided for each wheel of the vehicle, and a damping force setting alteration control is carried out separately for each shock absorber on the basis of the damping force change rate output by the corresponding sensor. If the sensitivity levels of the sensors provided for the respective shock absorbers are different from each other, the damping force change rates output by these sensors will be different from each other for the same road surface condition. For example, the damping force change rate obtained when the left front wheel runs on a projection on the road surface is different from that obtained when the left rear wheel runs on the same projection. As a result, there is a possibility that the setting of only some of the four shock absorbers are altered under the same condition. In this case, the alteration conditions for the shock absorbers are different from each other, and riding comfort as well as vehicle drivability and stability deteriorate.

In order to eliminate the above-mentioned problem, it is necessary to use sensors which have the same sensing characteristics. However, in actuality, it is very difficult to use sensors which have the same sensing characteristics. It may be possible to initially adjust the sensing characteristics of the sensors. However, the sensing characteristics of the sensors will deteriorate with age even if the initial adjustment is carried out.

SUMMARY OF THE INVENTION

It is a general object of the present invention to provide an improved shock absorber control system in which the above-mentioned problems are eliminated.

A more specific object of the present invention is to provide a shock absorber control system in which the setting of the damping force of each shock absorber can be equally altered under the same condition even if the sensors provided respectively for the shock absorbers have different sensing characteristics.

The above-mentioned objects of the present invention are achieved a shock absorber control system having shock absorbers provided respectively between wheels of a vehicle and a body thereof, each of the shock absorbers having at least two different characteristics of a damping force, the shock absorber control system comprising:

road surface condition detecting means, provided for the respective shock absorbers, for detecting roughness of a road surface on which the vehicle is traveling and for outputting road surface condition detection signals which are related to the respective shock absorbers and which indicate whether or not the road surface is rough;

damping force characteristic alteration means, provided for the respective shock absorbers, for comparing the road surface condition detection signals with reference values provided for the respective shock absorbers and for separately altering the setting of the shock absorbers on the basis of comparison results obtained for the respective shock absorbers; and correction means, coupled to the road surface condition detecting means and the damping force characteristic alteration means, for separately generating signals indicative of detection characteristics of the road surface condition detecting means provided for the respective shock absorbers on the basis of the road surface condition detection values and for separately correcting either the reference values or the road surface condition detection values on the basis of the detection characteristics of the road surface condition detecting means provided for the respective shock absorbers.

BRIEF DESCRIPTION OF THE DRAWINGS

Other objects, features and advantages of the present invention will become more apparent from the following detailed description when read in conjunction with the accompanying drawings, in which:

FIG.4 is a graph illustrating a damping force characteristic of the variable damping force type shock absorber shown in FIG.3A;

FIG.7 is a timing chart illustrating the operation of the damping force detection circuit shown in FIG. 6 and a damping force alteration control;

FIG.8 is a circuit diagram of a driver circuit shown in FIG.5;

FIGS.9A, 9B and 10 are respectively flowcharts illustrating the damping force alteration control; and FIG.11 is a flowchart illustrating a variation of the embodiment of the present invention.

DESCRIPTION OF THE PREFERRED EMBODIMENTS

Figure 1:
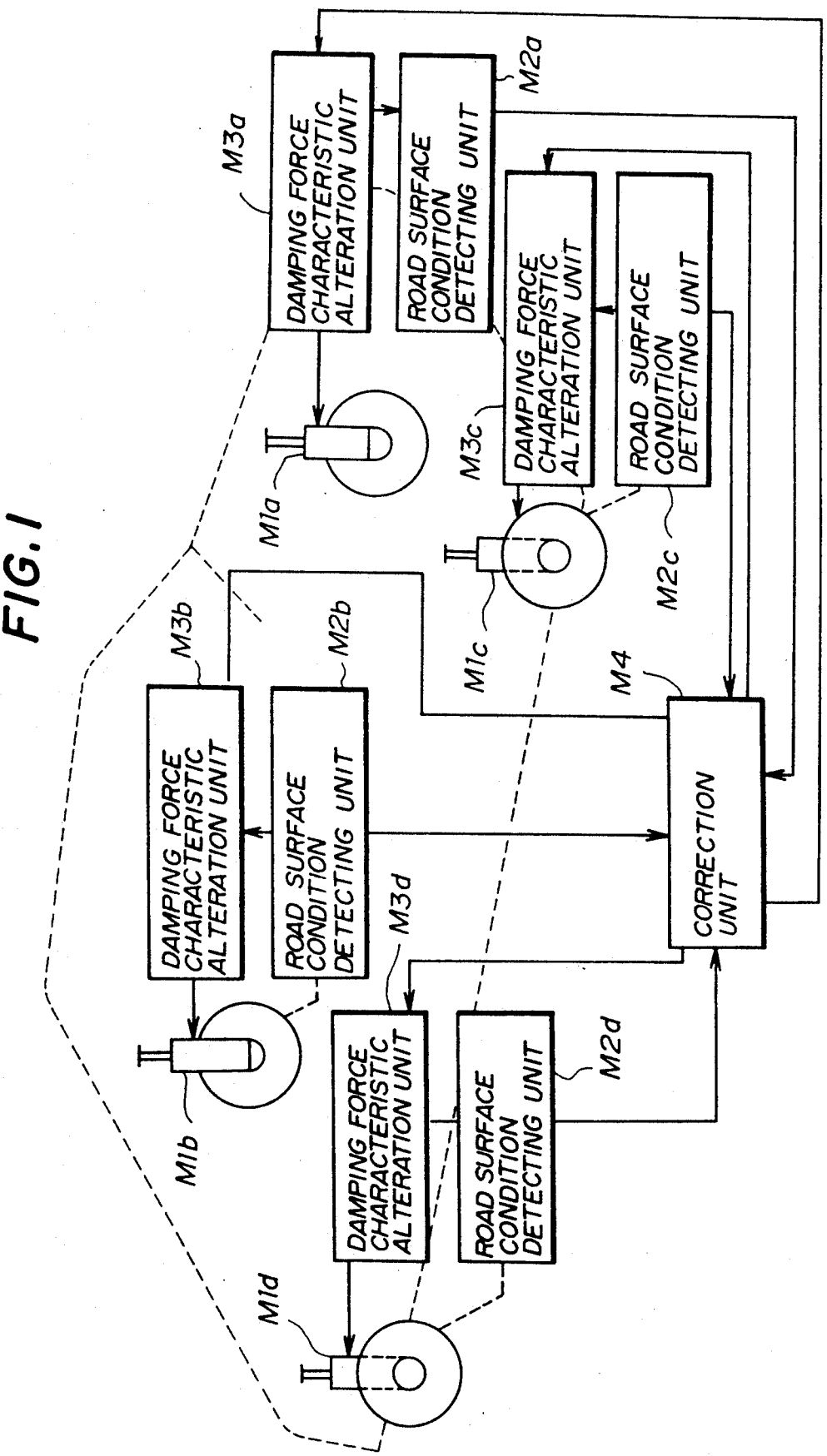
FIG.1 is a block diagram illustrating an outline of a shock absorber control system according to the present invention.

Referring to FIG.1, a vehicle has has four shock absorbers M1a, M1b, M1c and M1d, each having at least two different characteristics of the damping force (soft state and hard state). A shock absorber control system according to a preferred embodiment of the present invention has road surface condition detecting units M2a, M2b, M2c and M2d, damping force characteristic alteration units M3a, M3b, M3c and M3d, and a correction unit M4.

The road surface condition detecting units M2a, M2b, M2c and M2d are provided for the shock absorbers M1a, M1b, M1c and M1d, respectively. The road surface condition detecting units M2a, M2b, M2c and M2d respectively detect a roughness of a road surface on which the vehicle is traveling from signals related to the shock absorbers M1a, M1b, M1c and M1d, and respectively generate road surface condition detection values which indicate whether or not the road surface is rough. The damping force characteristic alteration units M3a, M3b, M3c and M3d are provided for the shock absorbers M1a, M1b, M1c and M1d, respectively, and compare the road surface condition detection values with respective reference values, and respectively alter the setting of the damping forces of the shock absorbers M1a, M1b, M1c and M1d on the basis of the comparison results. The correction unit M4 calculates detection characteristics of the road surface condition detecting units M2a, M2b, M2c and M2d from the respective road surface condition detection values generated and output by these units, and corrects the respective reference values or the road surface condition detection values on the basis of the calculated detection characteristics. With the above arrangement, it becomes possible to alter the setting of the damping force of each of the shock absorbers M1a, M1b, M1c and M1d under an identical alteration condition (level).

A description will now be given of the apparatus according to the preferred embodiment of the present invention in more detail.

Figure 2:
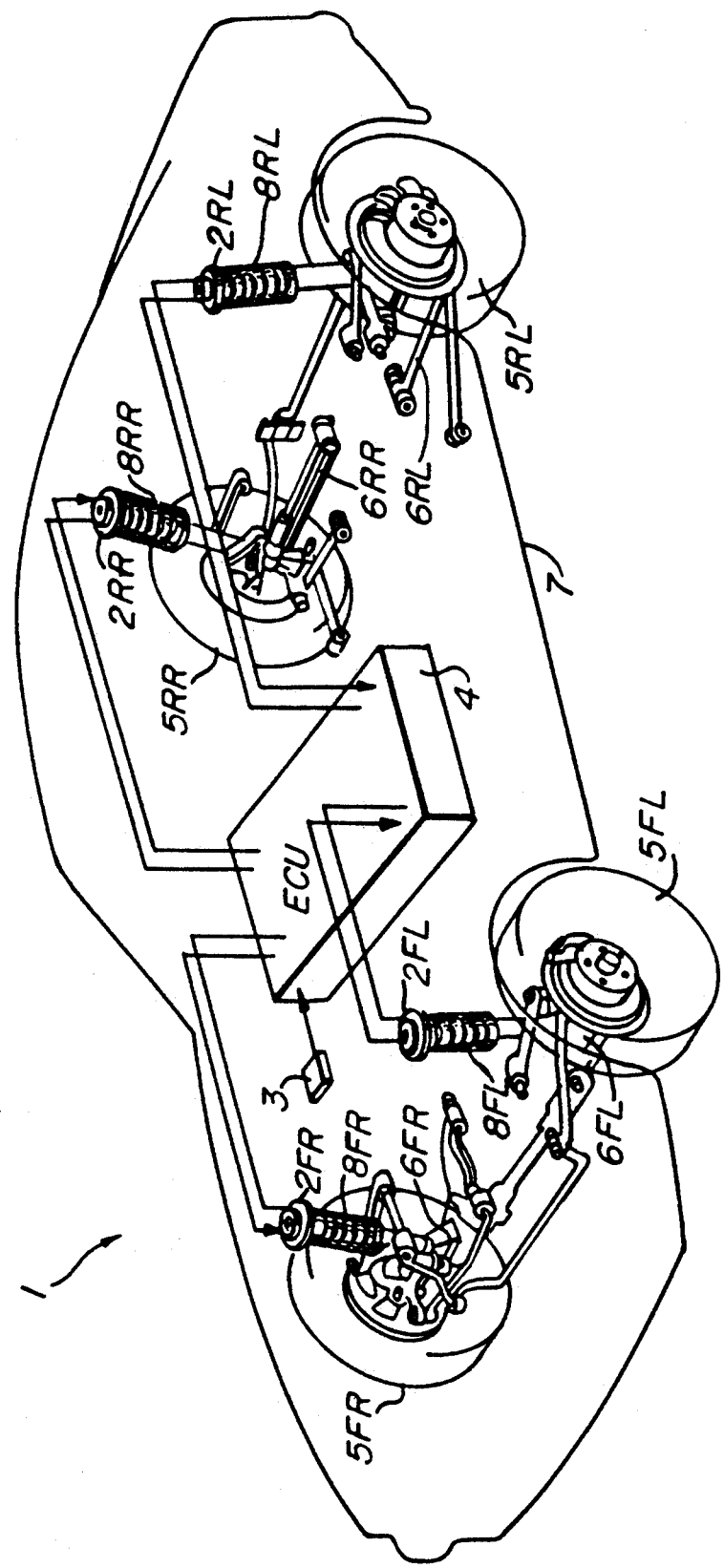
FIG.2 is a perspective view of a vehicle which has a damping force control apparatus according to a preferred embodiment of the present invention.

Referring to FIG.2, there is illustrated the entire structure of an automotive vehicle 1 having an apparatus for controlling the setting (characteristic) of the damping force of each shock absorber according to the preferred embodiment of the present invention. The vehicle 1 has four variable damping force type shock absorbers 2FL, 2FR, 2RL and 2RR (hereafter simply referred to as shock absorbers). The damping force control apparatus has a vehicle speed sensor 3 and an electronic control unit (hereafter simply referred to as an ECU) 4.

The shock absorbers 2FL, 2FR, 2RL and 2RR respectively have piezoelectric load sensors which sense the damping forces exerted on the shock absorbers 2FL, 2FR, 2RL and 2RR, and piezoelectric actuators for switching the setting of the damping forces between a high level (hard state) and a low level (soft state). The shock absorbers 2FL, 2FR, 2RL and 2RR are respectively provided, together with coil springs 8FL, 8FR, 8RL and 8RR, between a vehicle 7 and suspension lower arms 6FL, 6FR, 6RL and 6RR of a left front wheel 5FL, a right front wheel 5FR, a left rear wheel 5RL and a right rear wheel 5RR. On the other hand, a detection signal from the vehicle speed sensor 3 is input to the ECU 4, which outputs controls signals to the above-mentioned piezoelectric actuators.

A description will now be given of the structures of the shock absorbers 2FL, 2FR, 2RL and 2RR. Since the shock absorbers 2FL, 2FR, 2RL and 2RR have the same structures, only the shock absorber 2FL provided for the left front wheel 5FL will be explained below.

Figure 3A:
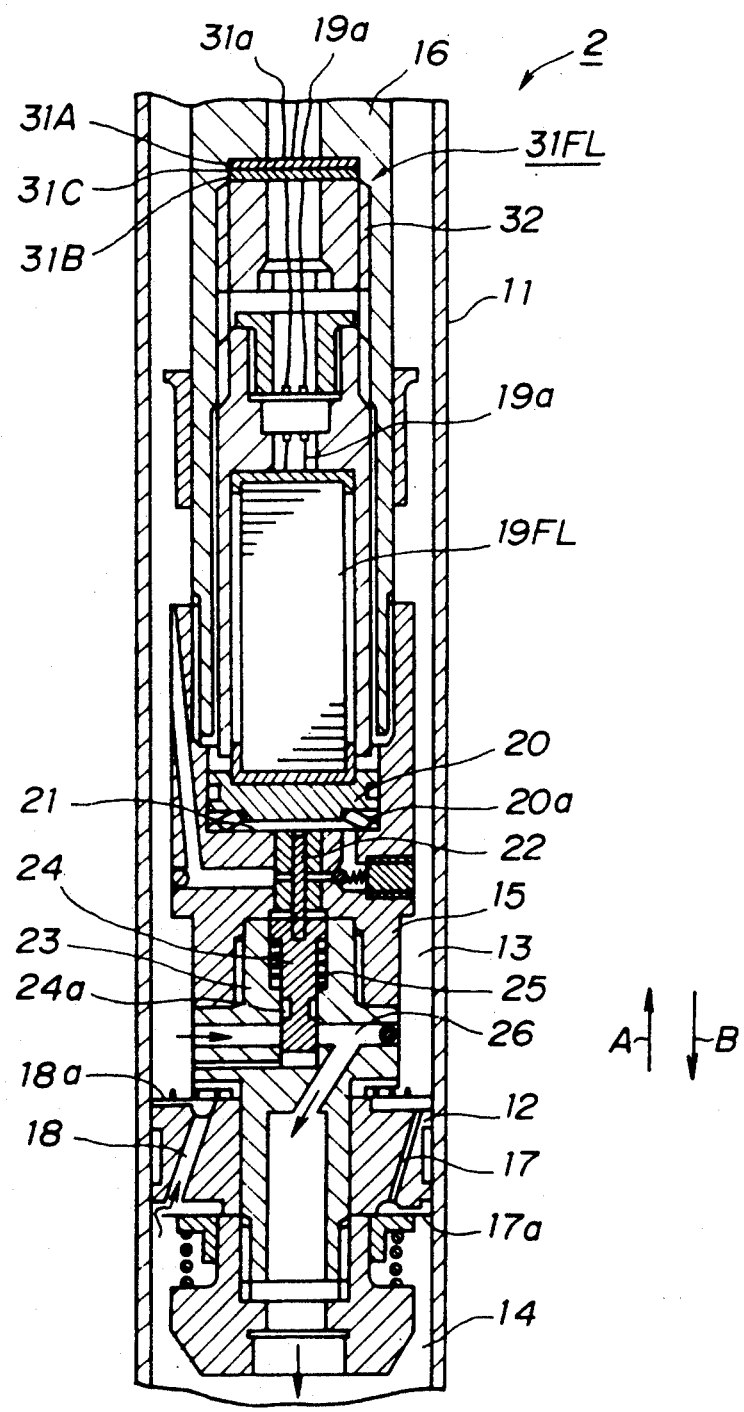
FIG.3A is a partial cross-sectional view of a variable damping force type shock absorber.

FIG.3A illustrates the structure of the shock absorber 2FL. The shock absorber 2FL has a cylinder 11. A main piston 12 engages with an inner wall of the cylinder 11 so that the main piston 12 can slide in the cylinder 11 in the axial directions indicated by arrows A and B. The inner area of the cylinder 11 is divided into a first fluid room 13 and a second fluid room 14 by the main piston 12. The main piston 12 is connected to one end of a piston rod 15, which has the other end fixed to a shaft 16. A lower portion (not shown for the sake of simplicity) of the shaft 11 is connected to the lower arm 6FL for the left front wheel 5FL, and an upper portion (also not shown for the sake of simplicity) of the shaft 11 is connected to the vehicle body 7.

The main piston 12 has an expansion side fixed orifice 17 and a contraction side fixed orifice 18. The fixed orifices 17 and 18 respectively connect the first fluid room 13 and the second fluid room 14 to each other. A plate valve 17a which limits the flow of actuating oil to one direction is provided on an outlet port side of the expansion side fixed orifice 17. Similarly, a plate valve 18a which limits the flow of actuating oil to one direction is provided on an outlet port side of the contraction side fixed orifice 18.

When the main piston 12 slides in the cylinder 11 in the direction A or B, the actuating oil in the first fluid room 13 flows to the second fluid room 14 through the expansion side fixed orifice 17, and the actuating oil in the second fluid room 14 flows to the first fluid room 13 through the contraction side fixed orifice 18. The damping force of the shock absorber 2FL is based on the cross section of a passage of the actuating oil, as will be described later.

The piston rod 15 has a central hollow portion in which a piezoelectric actuator 19FL is provided. The piezoelectric actuator 19FL is formed of a member in which electrostriction elements are stacked. More specifically, thin plates formed of piezoelectric ceramics are layered through electrodes. In other words, one electrode is sandwiched between two adjacent third plates. A lead 19a provided in a passage extending in the shaft 16 in the axial direction is connected to the electrodes. A piston 20 is provided at a position close to a lower end surface of the piezoelectric actuator 19FL. Normally, the piston 20 is urged in the direction A by a leaf spring 20a. The piston 20 is slidable in the central hollow portion of the piston rod in the directions A and B.

When a voltage equal to, for example, 600 volts is applied to the piezoelectric actuator 19FL via the lead 19a, the piezoelectric actuator 19FL expands, and the piston 20 moves a distance between, for example, 10μm and 100μm in the direction B. On the other hand, when a voltage equal to, for example, a ground potential is applied to the piezoelectric actuator 19FL via the lead 19a, it is discharged and thus contracts. Thus, the piston 20 is moved in the direction A due to the force of the leaf spring 20a.

The central hollow portion of the piston rod 15 and a bottom surface of the piston 20 form an oil sealing room 21. A column-shaped plunger 22 is slidably provided in a through hole provided in the piston rod 15. The through hole extends in the axial direction and has one end which faces a bottom portion of the oil sealing room 21. That is, an upper end of the plunger 22 faces the bottom portion of the oil sealing room 21. A lower end of the plunger 22 engages with an upper portion of a spool valve 24, which slidably engages with an engagement hole provided in a housing 23 fixed to the piston rod 15.

The spool valve 24 is urged in the direction A by a spring 25. A ring-shaped groove 24a is formed in a lower portion of the spool valve 24, which has a lowermost portion shaped into a column. Further, a sub fluid passage 26 which connects the first fluid room 13 and the second fluid room 14 to each other is provided in the piston rod 15. Normally, the sub fluid passage 26 is interrupted by the lowermost portion of the spool valve 24 urged in the direction A by the spring 25, so that the sub fluid passage 26 is divided into two passage portions.

When a voltage equal to, for example, 600 volts is applied to the piezoelectric actuator 19FL, it expands and causes the piston 20 to move in the direction B. Thus, the pressure in the oil sealing room 21 increases, so that the plunger 22 and the spool valve 24 move in the direction B. Thus, the divided passage portions of the sub fluid passage 26 are connected to each other via the ring-shaped groove 24a formed in the circumferential outer surface of the lower portion of the spool valve 24. As a result, the first fluid room 13 and the second fluid room 14 are mutually connected via the sub fluid passage 26. Thus, the cross section of the actuating oil which passes through the main piston 12 increases, so that the amount of the actuating oil passing through the main piston 12 substantially increases. As a result, the damping force of the shock absorber 2FL decreases. That is, the setting of the damping force is altered to the low level (soft state) from the high level (hard state). It should be noted that normally, the setting of the damping force is maintained in the high level. FIG.4 is a graph showing the relationship between the damping force and a piston speed (m/sec).

Figure 3B:
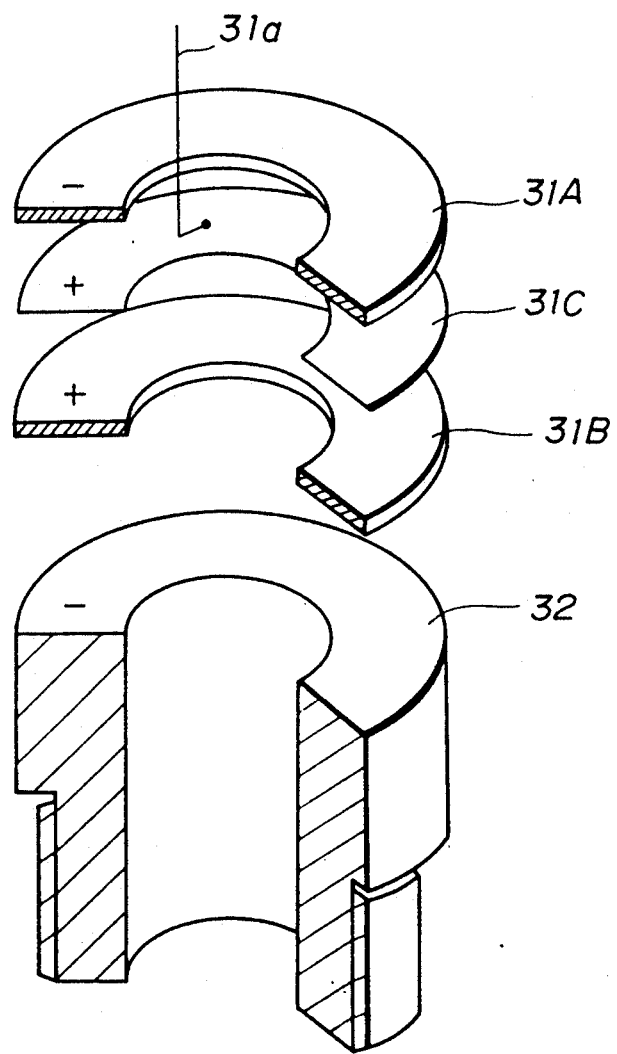
FIG.3B is an exploded perspective view of a piezoelectric load sensor provided in the variable damping force type shock absorber shown in FIG.3A.

A piezoelectric load sensor 31FL, which senses the magnitude of the damping force exerted on the shock absorber 2FL, is provided on an upper portion of the shaft 16. More specifically, the piezoelectric load sensor 31FL is fixed to the shaft 16 by a nut 32. As shown in FIG.3B, the piezoelectric load sensor 31FL has an electrode 31C sandwiched between two piezoelectric thin plates 31A and 31B formed of piezoelectric ceramics such as PZT. The electrode 31C is connected to the ECU 4 via a lead 31a.

Figure 5:
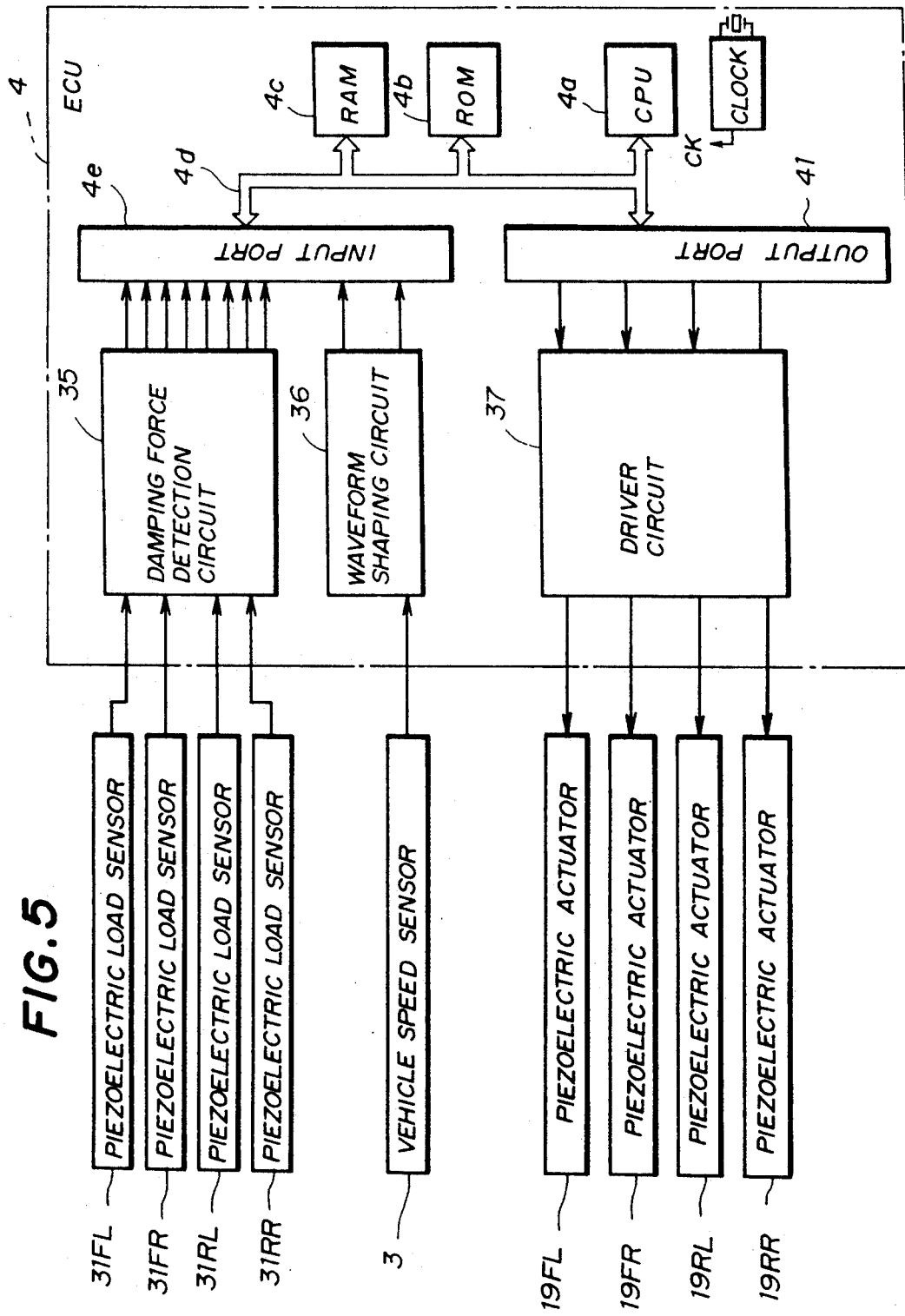
FIG.5 is a block diagram of an electronic control unit used in the preferable embodiment of the present invention.

The ECU 4 has a configuration as shown in FIG.5. The ECU 4 has a central processing unit (CPU) 4a, a read only memory (ROM) 4b and a random access memory (RAM) 4c, which form a logic operation circuit. The CPU 4a, the ROM 4b and the RAM 4c are connected to an input port (interface) 4e and an output port (interface) 4f via a common bus 4d. Further, the ECU 4 has a damping force detection circuit 35, a waveform shaping circuit 36 and a driver circuit 37. The damping force detection circuit 35 is provided between the piezoelectric load sensors 31FL, 31FR, 31RL and 31RR and the input port 4e. The damping force detection circuit 35 respectively detects, from the charges generated by the piezoelectric load sensors 31FL, 31FR, 3lRL and 31RR, the damping forces of the shock absorbers 2FL, 2FR, 2RL and 2RR as well as the rates of change of the damping forces thereof. The waveform shaping circuit 36 receives a detection signal generated and output by the vehicle speed sensor 3, and shapes it into an appropriate waveform suitable for digital processing. Output signals of the damping force detection circuit 35 and the waveform shaping circuit 36 are input to the input port 4e.

The driver circuit 37 is provided between the output port 4f and the piezoelectric load sensors 19FL, 19FR, 19RL and 19RR. The driver circuit 37 receives, via the output port 4f, control signals (damping force alteration signals) and generates signals which are actually applied to the piezoelectric actuators 19FL, 19FR, 19RL and 19RR. When such signals are applied to the piezoelectric actuators 19FL, 19FR, 19RL and 19RR, they expand, so that the setting of the damping forces of the shock absorbers 2FL, 2FR, 2RL and 2RR are altered to the low level.

Figure 6:
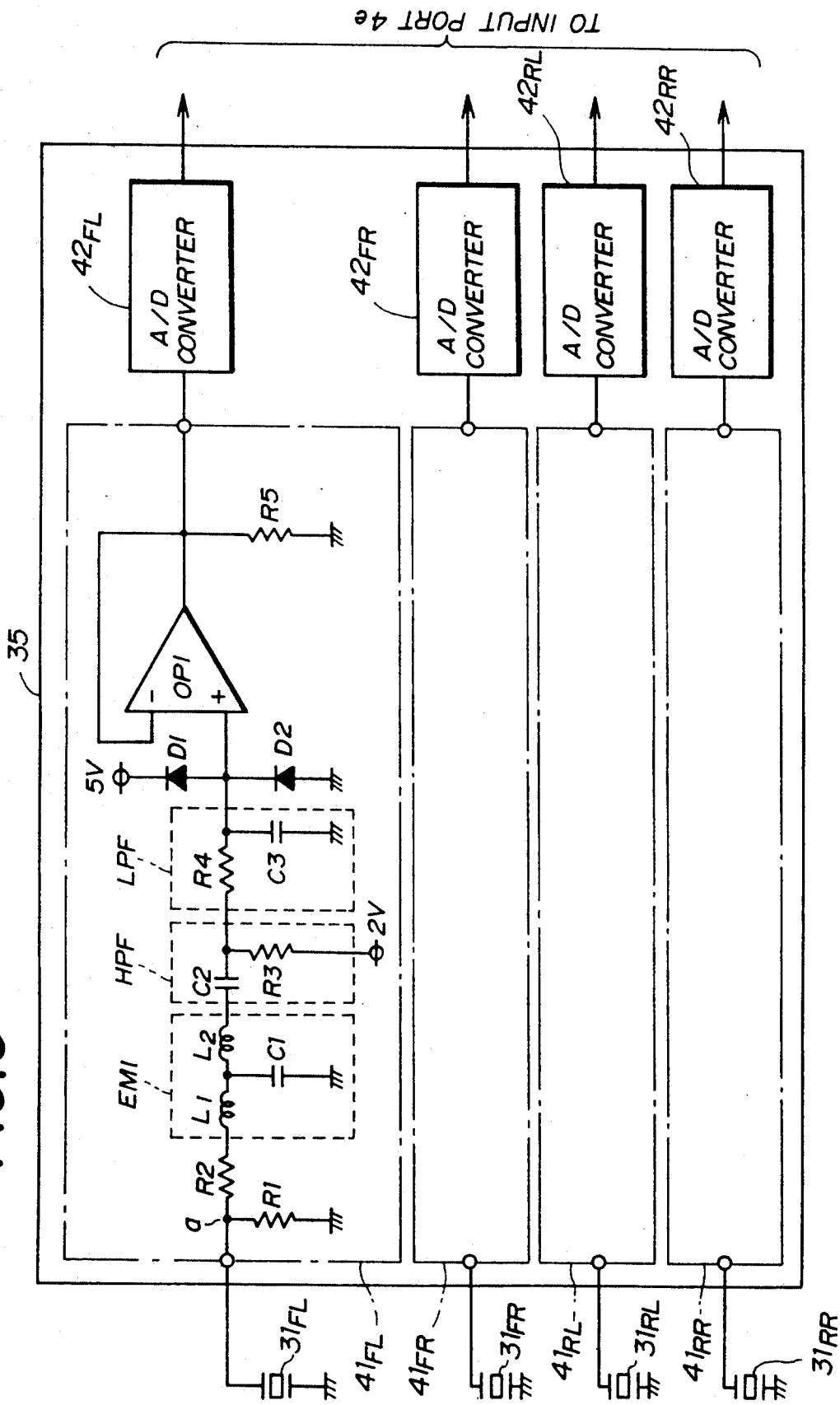
FIG.6 is a circuit diagram of a damping force detection circuit shown in FIG.5.

As shown in FIG.6, the damping force detection circuit 35 has four detection circuits 41FL, 41FR, 41RL and 41RR provided respectively for the piezoelectric load sensors 31FL, 31FR, 31RL and 31RR. A description will now be given of the detection circuit 41FL. It will be noted that the other detection circuits 41FR, 41RL and 41RR operate in the same way as the detection circuit 41FL.

The detection circuit 41FL has a resistor R1 connected to the piezoelectric load sensor 31FL in parallel form. A change based on the damping force by expansion or contraction of the shock absorber 2FL is developed across the piezoelectric load sensor 31FL. A current based on the above charge passes through the resistor R1. That is, a current passes through the resistor R1 each time the damping force is changed and thus a charge is generated in the piezoelectric load sensor 31FL. The amount of this current indicates the damping force change rate. The current passing through the resistor R1 is converted into a voltage by the resistor R1. That is, a voltage developed across the resistor R1 indicates the damping force change rate related to the shock absorber 2FL. The voltage across the resistor R1 is subjected to a signal processing which will be described below, and applied to an analog-to-digital (A/D) converter 42FL. The A/D converter 42FL converts an output signal from the damping force change rate detection circuit 41FL into a digital detection signal indicative of the damping force change rate related to the shock absorber 2FL. Similarly, output signals from the damping force change rate detection circuits 41FR, 41RL and 41RR are applied to A/D converters 42FR, 42RL and 42RR, which generates detection signals which indicate the damping force change rates related to the shock absorbers 2FR, 2RL and 2RR, respectively.

The voltage developed across the resistor R1 is applied to a radio wave noise elimination filter EMI of the damping force change rate detecting circuit 50 via a resistor R2. The noise elimination filter EMI is composed of two coils L1 and L2, and a capacitor C1, and eliminates high-frequency components, such as radio wave noise, from the voltage signal applied thereto. A voltage signal obtained by eliminating the high-frequency components is applied to a highpass filter HPF, which has a capacitor C2 and a resistor R3. More specifically, the voltage signal from the noise elimination filter EMI is applied to the capacitor C2, and an offset voltage equal to 2 volts is applied to the resistor R3. The highpass filter HPF eliminates low-frequency components having the frequencies equal to or lower than b 0.1Hz from the voltage signal from the noise elimination filter EMI. At the same time, the voltage signal from the noise elimination filter EMI is increased by 2 volts. An output signal of the highpass filter HPF is applied to a lowpass filter LPF, which has a resistor R4 and a capacitor C3. The lowpass filter LPF eliminates high-frequency components having the frequencies equal to or higher than 100Hz from the signal from the highpass filter HPF. An output signal of the lowpass filter LPF passes through a buffer circuit formed of an operational amplifier OP1, and then applied to he A/D converter 42FL. The output terminal of the buffer circuit is grounded via a resistor R5. A series circuit consisting of diodes D1 and D2 is connected between a high-potential side power source having a voltage of 5 volts and a low-potential side power source having a voltage equal to the ground level. The diodes D1 and D2 are provided for protecting the operational amplifier OP1 so that the input voltage applied to the non-inverting input terminal of the operational amplifier OP1 is maintained between 0 volt and 5 volts.

The operation of the damping force change rate detecting circuit 50 will be described below with reference to FIG. 7. FIG. 7(A) shows a road surface having a projection. Then the left front wheel 5FL runs on the projection and thus the shock absorber 2FL contracts, the voltage developed across the resistor R1 (potential at a node 'a' shown in FIG. 6 with respect to the ground level) changes on the basis of an expansion/contraction acceleration, as shown in FIG. 7(B). The voltage shown in FIG. 7(B) is processed by the filters EMI, HPF and LPF, and passes through the operational circuit OP1. Thereby, a voltage signal which has frequencies between 0.1Hz and 100Hz and which is 2 volts higher than the voltage signal obtained at the node "a" is output, as the aforementioned damping force change rate signal, from the damping force change rate detecting circuit 50, as shown in FIG. 7(C).

It will be noted that an arrangement in which the voltage signal having the frequencies between 0.1Hz and 100Hz is extracted from the voltage signal at the node 'a', is used due to the fact that the shock absorber 2FL expands and contracts in this frequency range due to the structure of he shock absorber 2FL.

Referring to FIG. 8, the driver circuit 37 (FIG. 5) has a high-voltage generation circuit 47, and charge/discharge circuits 47FL, 47FR, 47RL and 47RR provided respectively for the piezoelectric actuators 19FL, 19FR, 19RL and 19RR. The high-voltage generation circuit 45 has a DC/DC converter 45a and a capacitor 45b connected to an output terminal of the DC/DC converter 45. The Dc/DC converter 45a converts the battery voltage +B into a voltage of 600 volts, which is stored in the capacitor 45b. The charge/discharge circuits 47FL, 47FR, 47RL and 47RR receives damping force alteration signals generated and output by the CPU 4a (FIG. 5), and charge or discharge the piezoelectric actuators 19FL, 19FR, 19RL and 19RR in response to the respective camping force alteration signals. More specifically, when the damping force alteration signals are maintained at a low level, the charge/discharge circuits 47FL, 47FR, 47RL and 47RR apply a high voltage approximately equal to, for example, 600 volts, so that the piezoelectric actuators 19FL, 19FR, 19RL and 19RR are charged. On the other hand, when the damping force alteration signals are maintained at a high level, the charge/discharge circuits 47FL, 47FR, 47RL and 47RR discharge the piezoelectric actuators 19FL, 19FR, 19RL and 19RR, respectively.

The charge/discharge circuit 47FL has resistors R7-R10, diodes D9 and D10, and transistors Tr1 and Tr2. The damping force alteration signal which is related to the shock absorber 2FL and generated by the CPU 4a is applied to the base of the transistor Tr1 through the resistor R7. The base of the transistor Tr1 is grounded through the resistor R8, and the emitter thereof is grounded. A series circuit consisting of the diodes D9 and D10 is connected between the collector and emitter of the transistor Tr1. The anode of the diode D9 is grounded, and the cathode of the diode D10 is connected to the collector of the transistor Tr1. The high-voltage generation circuit 45 generating the high voltage equal to 600 volts is connected to the collector of the transistor Tr1 and the base of the transistor Tr2 via the resistor R9. The high voltage equal to 600 volts is directly applied to the collector of the transistor Tr2. The emitter of the transistor Tr2 is connected to the piezoelectric actuator 19FL via the resistor R10, the cathode of the diode D9 and the anode of the diode D10.

When the damping force alteration signal having the low level is applied to the charge/discharge circuit 47FL, the transistors Tr1 and Tr2 are turned OFF AND ON, respectively. Thus, the high-voltage generation circuit 45 is connected to the piezoelectric actuator 19FL via the transistor Tr2 and the resistor R10, so that the high voltage approximately equal to 600 volts is applied to the piezoelectric actuator 19FL. On the other hand, when the damping force alteration signal having the high level is applied t the charge/discharge circuit 47FL, the transistors Tr1 and Tr2 are turned on and OFF, respectively. Thus, the high-voltage generation circuit 45 is disconnected from the piezoelectric actuator 19FL, and instead the piezoelectric actuator 19FL is grounded via the resistor R10, the diode D10 and the transistor Tr1, so that the piezoelectric actuator 19FL is discharged.

The piezoelectric actuators 19FL, 19FR, 19RL and 19RR expand and thus the setting levels of the damping forces of the shock absorbers 2FL, 2FR, 2RL and 2RR decrease when the high voltages approximately equal to 600 volts are respectively applied to the piezoelectric actuators 19FL, 19FR, 19RL and 19RR. On the other hand, the piezoelectric actuators 19FL, 19FR, 19RL and 19RR contract and thus the setting levels of the damping forces of the shock absorbers 2FL, 2FR, 2RL and 2RR increase when the piezoelectric actuators 19FL, 19FR, 19RL and 19RR are discharged. As a result, in order to set the damping forces of the shock absorbers 2FL, 2FR, 2RL and 2RR to the low level (soft state), the damping force alteration signals having the low levels are applied to the charge/discharge circuits 47FL, 47FR, 47RL and 47RR. On the other hand, in order to set the damping forces of the shock absorbers 2FL, 2FR, 2RL and 2RR to the high level (hard state), the damping force alteration signals having the high levels are applied to the charge/discharge circuits 47FL, 47FR, 47RL and 47RR.

A description will now be given of a damping force alteration process which controls the damping force characteristics of the shock absorbers 2FL, 2FR, 2RL and 2RR and which is repeatedly carried out by the CPU 4a (FIG. 5), with reference to FIGS. 9A, 9B and 10.

Figure 9A:
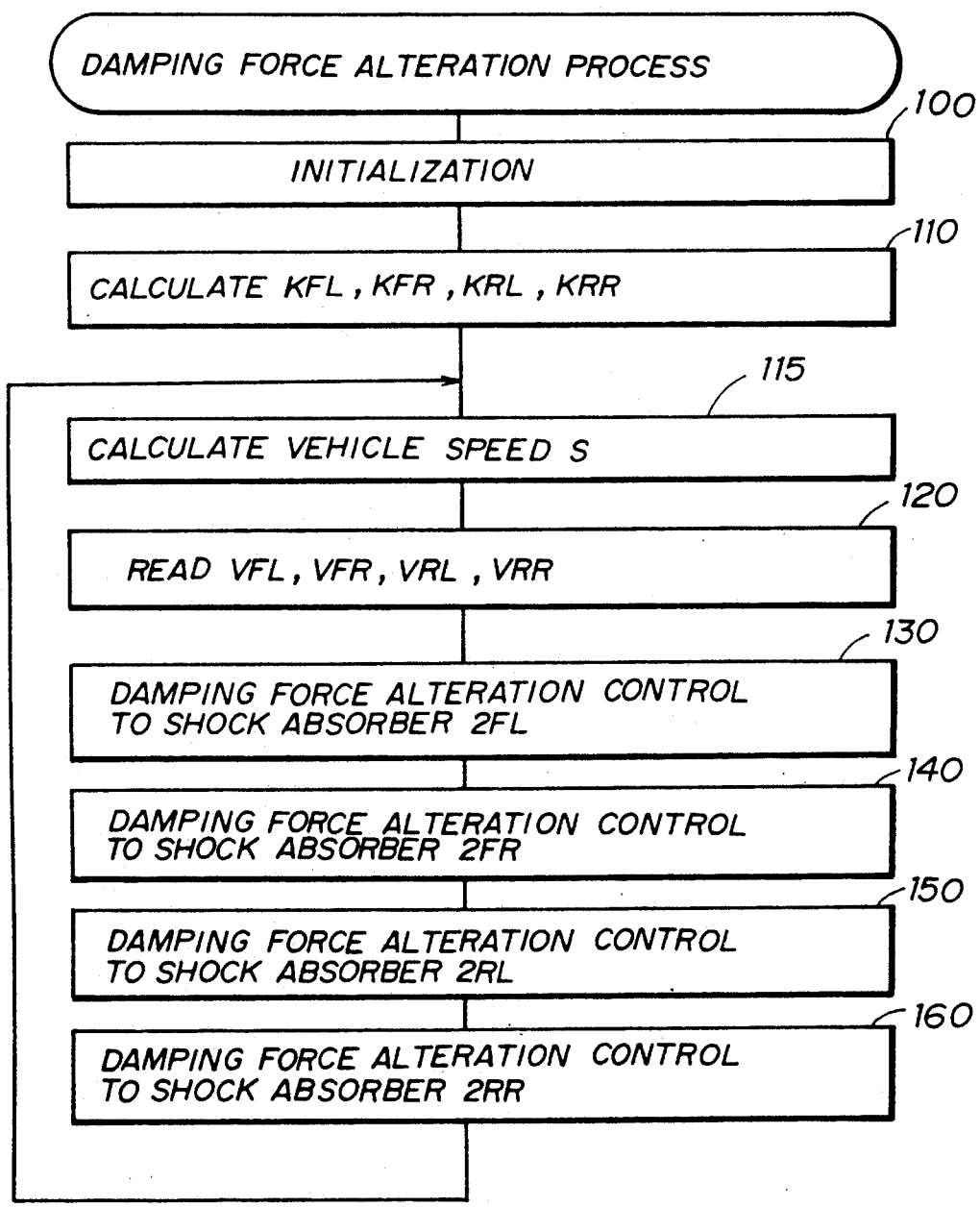

Referring to FIG. 9A, at step 100, the CPU 4a carries out an initialization process in which a counter and threshold values for detecting a roughness of a road surface which will be described later are initialized. At step 110, the CPU 4a calculates sensor output correction coefficients KFL, KFR, KRL and KRR, which are used for compensating for differences between the detection characteristics of the piezoelectric load sensors 31FL, 31FR, 31RL and 31RR as well as the detection circuits 41FL, 41FR, 41RL and 41RR. Steps 111-113 shown in FIG. 9B show the details of the procedure at step 110.

At step 111, the CPU 4a causes the piezoelectric actuator 19FL provided for the left front wheel 5FL to be charged or discharged. More specifically, the CPU 4a outputs the damping force alteration signal maintained at the low level to the driver circuit 37 (FIG. 8), so that the high voltage is applied to the piezoelectric actuator 19FL. After that, the CPU 4a changes the damping force alteration signal to the high level, so that the piezoelectric actuator 19FL is discharged and thus contacts. At step 112, the CPU 4a reads an output SFL of the piezoelectric load sensor 31FL through the damping force charge rate alteration circuit 35. That is, the CPU 4a reads the damping force change rate signal indicated by the output SFL of the piezoelectric load sensor 31FL. At step 113, the CPU 4a the ration of the output SFL to a master (standard) sensor output MFL and outputs a sensor output correction coefficient KFL ($-$MFL/SFL). Similarly, the CPU 4a calculates sensor output correction coefficients KFR, KRL and KRR provided respectively for the wheels 5FR, 5RL and 5RR, and returns to step 15 shown in FIG. 9A.

A procedure starting from step 115 shown in FIG. 9A is repeatedly carried out by the CPU 4a. At step 115, the CPU 4a calculates a current vehicle speed from the detection signal output by the vehicle speed sensor 3 (FIG. 5). At step 120, the CPU 4a reads the damping force change rate signals VFL, VFR, VRL and VRR on the basis of the detection signals from the damping force change rate detection circuit 35. At steps 130-160, the CPU 4a separately executes the damping force alteration control for the shock absorbers 2FL, 2FR, 2RL 2RR, and returns to step 115.

Figure 10:
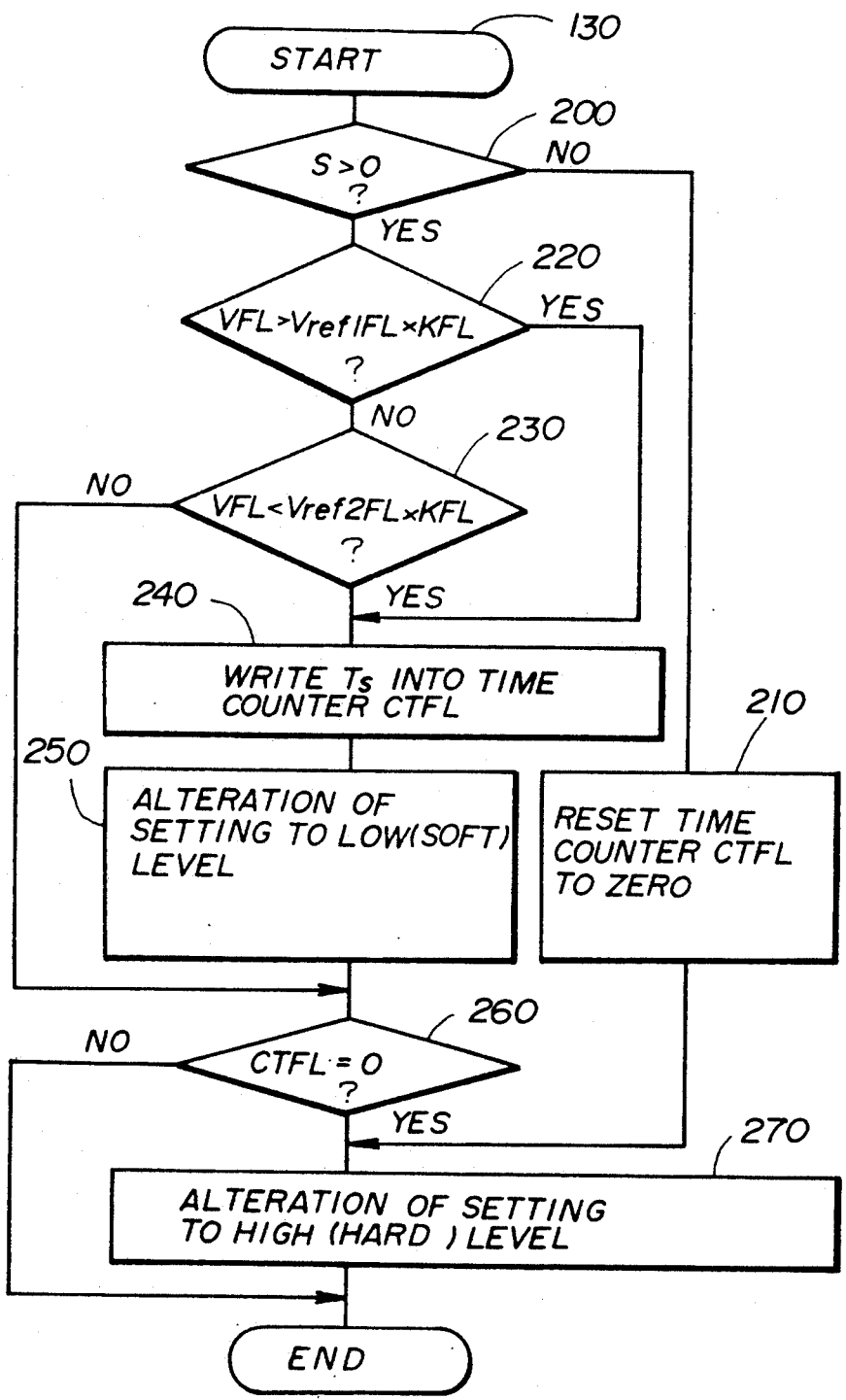

At each of the steps 130-160, the CPU 4a executes a procedure as shown in FIG. 10, which shows a procedure related to the shock absorber 2FL for the left front wheel 5FL. The procedures for the shock absorbers 2FR, 2RL and 2RR are carried out in the same way as the procedure for the shock absorber 2FL.

At step 200, the CPU 4a determines whether or not the vehicle speed obtained at step 115 shown in FIG. 9A is greater than zero. In other words, step 200 determines whether or not the vehicle is traveling. When it is determined, at step 200, that the vehicle is not traveling, the CPU 4a executes step 210 at which step, a timer counter CTFL is reset to zero.

On the other hand, when it is determined, at step 200, that the vehicle is traveling (S>0), the CPU 4a executes step 220 at which step the damping force change rate signal VFL which is related to the shock absorber 2FL and which is read at step 120 shown in FIG. 9A has become greater than an after-correction upper limit value Vref1KFL, which is obtained by multiplying an upper limit value Vref1FL determined beforehand for the shock absorber 2FL by the sensor output correction coefficient KFL calculated at step 110. Similarly, upper limit values Vref1FR, Vref1RL and Vref1RR are determined beforehand for the shock absorbers 2FR, 2RL and 2RR, respectively. When it is determined, at step 220, that VFL$\leq$Vref1KFL (=Vref1$\times$KFL), the CPU 4a executes step 230 at which step it is determined whether or not the damping force change rate signal VFL has become smaller than an after-correction lower limit value Vref2KFL, which is obtained by multiplying a lower limit value Vref2FL determined beforehand for the shock absorber 2FL by the sensor output correction coefficient KFL. Similarly, upper limit values Vref2FR, Vref2RL and Vref2RR are determined beforehand for the shock absorbers 2FR, 2RL and 2RR, respectively. It will be noted that the upper and lower limit values Vref1FL and Vref2FL are threshold values for detecting a roughness of the road surface, and are set to be standard values.

When it is determined, at step 220, that VFL>Vref1KFL (=Vref1FL$\times$KFL), or it is determined, at step 230, that VFL<Vref2KFL (=vref2FL$\times$KFL), the CPU 4a concludes that the road surface is traveling is rough, and carries out step 240. At step 240, the CPU 4a writes, into the time counter CTFL, a soft state holding period Ts during which the setting of the damping force is maintained in the soft state. At step 250, the CPU 4a outputs the damping force alteration signal maintained at the low level to the charge/discharge circuit 47FL, so that the setting of the damping force of the shock absorber 2FL is altered to the low level (soft state). It will be noted that the timer counter CTFL is a down counter which counts down the soft state holding period Ts at predetermined intervals until the count value therein becomes zero.

After the setting of the shock absorber 2FL is altered to the low level at step 250, the CPU 4a executes step 260 at which it is determined whether or not the time counter CTFL has counted down the soft state holding period (that is, it is determined whether or not CTFL=0). When the result obtained at step 260 is YES, the damping force change rate signal VFL is continuously maintained in the range between the after-correction upper limit value Vref1KFL and the after-correction lower limit value Vref2KFL during the soft state holding period Ts.

When CTFL>0, the CPU 4a ends the procedure shown in FIG. 10. On the other hand, when CTFL=0, the CPU 4a executes step 270 at which step the CPU 4a outputs the damping force change alteration signal maintained at the high level to the charge/discharge circuit 47FL, so that the setting of the damping force of the shock absorber 2FL is altered to the high level (hard state). After the driving of the piezoelectric actuator 19FL is stopped, the CPU 4a ends the procedure shown in FIG. 10.

When the vehicle is running on a projection on the road surface shown in FIG. 7(A), the potential of the node 'a' shown in FIG. 6 changes, as shown i FIG. 7(B), and the damping force change rate signal VFL output by the damping force change rate detection circuit 35 exceeds that after-correction upper limit value Vref1KFL, as shown in FIG. 7(C). I this case, the CPU 4a concludes that the road surface on which the vehicle is traveling is trough. At this time, as shown in FIG. 7(D), the setting of the damping force of the shock absorber 2FL is altered to the low level (soft state). When the damping force change rate signal VFL having the offset voltage equal to 2 volts is continuously maintained in the range between Vref1KFL and Vref2KFL after it falls in this range, the setting of the damping force of the shock absorber 2FL is returned to the high level (hard state).

The above-mentioned preferred embodiment of the present invention uses a set of after-correction upper and lower limit values (Vref1KFL, Vref2KFL), (Vref1KFR, Vref2KFR), (Vref1KRL, Vref2KRL), (Vref1KRR, Vref2KRR) obtained by multiplying the predetermined upper and lower limit values (Vref1FL, Vref2FL), (Vref1KFR, Vref2KFR), (Vref1KRL, Vref2KRL), (Vref1KRR, Vref2KRR) obtained by multiplying the predetermined upper and lower limit values (Vref1FL, Vref2FL), (Vref1FR, Vref2FR), (Vref1RL, Vref2RL), (Vref1RR, (Vref2RR) by the sensor output correction coefficients KFL, KFR, KRL and KRR, respectively. Further, the sensor output correction coefficients KFL, KFR, KRL and KRR are calculated by expanding and contracting the piezoelectric actuators 19RL, 19FR, 19RL and 19RR immediately after the engine is started and before the damping force alteration control is started and by calculating the ratios MFL/SFL, MFR/SFR, MRL/SRL and MRR/SRR. With the above-mentioned arrangements, it becomes possible to alter the setting of the damping forces of the shock absorbers 2FL, 2FR, 2RL and 2RR at an identical damping force alteration level even if there are differences between the characteristics of the shock absorbers. As a result, improved driving controllability and stability can be obtained.

It will be noted that voltages are applied to the members of stacked electrostriction elements of the piezoelectric actuators 19FL, 19FR, 19RL and 19RR during the time vehicle is running. Thus, a polarization deterioration can be prevented, and variations in the characteristics of the piezoelectric actuators 19FL, 19FR, 19RL and 19RR do not deteriorate greatly with age. As a result, there is no need to correct the piezoelectric actuators 19FL, 19FR, 19RL and 19RR as in the case of the piezoelectric load sensors 31FL, 31FR, 31RL and 31RR.

In the above-mentioned embodiment of the present invention, the sensor output correction coefficients KFL, KFR, KRL and KRR are calculated before the damping force alteration control to the shock absorbers 2FL, 2FR, 2RL and 2RR is carried out.

Alternatively, it is possible to obtain the sensor output correction coefficients KFL, KFR, KRL and KRR during the time when the vehicle is traveling. For example, the sensor output correction coefficient KFL is calculated, as shown in FIG. 11, which shows the details of step 110 shown in FIG. 9. At step 301, the CPU 4a integrates the absolute values of the damping force change rates of the shock absorbers 2FL, 2FR, 2RL and 2RR (differences between the envelopes of the damping force change rate signals VFL, VFR, VRL and VRR and the offset voltage equal to 2 volts) during a predetermined period, and outputs integrated values OFL, OFR, ORL and ORR. At step 302, the CPU 4a calculates the means value labeled MS of the integrated values OFL, OFR, ORL and ORR (that is, MS=(FL+OFR+ORL+ORR)/4). At step 303, the CPU 4a calculates the sensor output correction coefficient KFL by dividing the means value MS by the integrated value OFL (KFL=MS/OFL). At step 303, it is also possible to calculate the sensor correction coefficient KFL by dividing the master sensor output OMFL by the integrated value OFL (KFL=OMFL/OFL). Similarly, the sensor output correction coefficients KFR, KRL and KRR can be calculated. Further, it is possible to multiply the sensor output correction value KFL by a deterioration coefficient based on the traveling distance and or the traveling time, so that the damping force alteration control becomes immune to deteriorations with age.

The aforementioned embodiments of the present invention correct the threshold values used for altering the setting of the damping forces of the shock absorbers 2FL, 2FR, 2RL and 2RR. Alternatively, it is possible to directly correct the damping force change rate signals VFL, VFR, VRL and VRR by, for example, multiplying these signals by the correction coefficients KFL, KFR, KRL and KRR. It is also possible to employ other sensors for sensing the damping force or a variation in the vehicle height, such as stroke sensors, in place of the piezoelectric load sensors 31FL, 31FR, 31RL and 31RR.

The present invention are not limited to the specifically disclosed embodiments, and variations and modifications may be made without departing from the scope of the present invention.

What is claimed is:

1. A shock absorber control system for controlling shock absorbers provided between respective wheels of a vehicle and a body thereof, each of said shock absorbers having at least two different characteristics of a damping force, said shock absorber control system comprising:

road surface condition detecting means, provided for the respective shock absorbers, for detecting roughness of a road surface on which the vehicle is traveling and for generating road surface condition detection signals which are related to the respective shock absorbers and which indicate whether or not the road surface is rough;

damping force characteristic alteration means, provided for the respective shock absorbers, for comparing said road surface condition detection signals with reference values provided for the respective shock absorbers and for separately altering the setting of damping forces of said shock absorbers on the basis of comparison results obtained for the respective shock absorbers; and correction means, coupled to said road surface condition detecting means and said damping force characteristic alteration means provided for the respective shock absorbers, for separately generating signals indicative of detection characteristics of said road surface condition detecting means provided for the respective shock absorbers on the basis of said road surface condition detection signals and for separately correcting either said reference values or said road surface condition detection signals on the basis of said detection characteristics of said road surface condition detecting means provided for the respective shock absorbers.

2. A shock absorber control system as claimed in claim 1, wherein:

said road surface condition detecting means provided for the respective shock absorbers comprise means for generating damping force change rate signals which show rates of change of the damping forces of said shock absorbers, said damping force change rate signals corresponding to said road surface condition detection signals; and said correction means comprises correction coefficient generating means, coupled to said road surface condition detecting means provided for the respective shock absorbers, for generating correction coefficients related to the respective reference values provided for said shock absorbers and for multiplying said reference values by said correction coefficients, so that said reference values are corrected.

3. A shock absorber control system as claimed in claim 2, wherein:
said correction coefficient generating means comprises ratio generating means for generating ratios of a predetermined standard value to said damping force change rate signals generated for the respective shock absorbers; and
said ratios of the predetermined standard value to said damping force change rate signals correspond to said correction coefficients respectively related to said reference values provided for the respective shock absorbers.

4. A shock absorber control system as claimed in claim 2, wherein:
said reference values provided for the respective shock absorbers comprise upper limit values and lower limit values provided for the respective shock absorbers;
said correction coefficient generating means comprises multiplying means for multiplying said upper limit values by said correction coefficients to thereby generate after-correction upper limit values provided for the respective shock absorbers and for multiplying said lower limit values by said correction coefficients to thereby generate after-correction lower limit values provided for the respective shock absorbers; and
said damping force characteristic alteration means comprises determining means, provided for the respective shock absorbers, for determining whether or not said damping force change rate signals are out of ranges respectively defined by said after-correction upper limit values and said after-correction lower limit values and for separately altering the setting of the damping forces of the respective shock absorbers from a hard state to a soft state when it is determined that said damping force change rate signals are out of said ranges said hard state and said soft state corresponding to said at least two characteristics of the damping force of each of said shock absorbers.

5. A shock absorber control system as claimed in claim 2, wherein said correction coefficient generating means comprises:
integration means for separately integrating said damping force change rate signals related to the respective shock absorbers during a predetermined period and for generating integrated values provided for the respective shock absorbers;
mean value generating means for generating a mean value of said integrated values by dividing the sum of said integrated values by the number of said wheels; and
ratio generating means for generating ratios of said mean value of said integrated values to said integrated values generated for the respective shock absorbers,
wherein said ratios of said mean value to said integrated values correspond to said correction coefficients related to said reference values provided for the respective shock absorbers.

6. A shock absorber control system as claimed in claim 2, wherein said correction coefficient generating means comprises:
integration means for separately integrating said damping force change rate signals related to the respective shock absorbers during a predetermined period and for generating integrated values provided for the respective shock absorbers; and
ratio generating means for generating ratios of predetermined values defined for the respective shock absorbers to said integrated values generated for the respective shock absorbers, and
wherein said ratios of said predetermined values to said integrated values correspond to said correction coefficients related to said reference values provided for the respective shock absorbers.

7. A shock absorber control system as claimed in claim 1, wherein:
said road surface condition detecting means provided for the respective shock absorbers comprise means for generating damping force change rate signals which show rates of change of damping forces of said shock absorbers, said damping force change rate signals corresponding to said road surface condition detection signals; and
said correction means comprises correction coefficient generating means, provided for the respective shock absorbers and coupled to said road surface condition detecting means, for generating correction coefficients respectively related to said reference values provided for the respective shock absorbers and for multiplying said road surface condition detection signals by said correction coefficients, so that said road surface condition detection signals are corrected.

8. A shock absorber control system as claimed in claim 2, wherein said road surface condition detecting means provided for the respective shock absorbers comprise piezoelectric load sensors which generate said damping force change rate signals.

9. A shock absorber control system as claimed in claim 4, wherein said damping force characteristic alteration means provided for the respective shock absorbers comprise soft state holding means for separately holding said shock absorbers in said soft state during a predetermined soft state holding period during which the damping force change rate signals related to said respective shock absorbers are continuously maintained within said ranges after said respective shock absorbers are set to said soft state from said hard state.

10. A shock absorber control system as claimed in claim 9, wherein said damping force characteristic alteration means provided for the respective shock absorbers comprise means for separately altering the setting of the damping forces of said shock absorbers from said soft state to said hard state after the elapse of said soft state holding period.

* * * * *